(12) United States Patent
Konishi

(10) Patent No.: US 9,223,748 B2
(45) Date of Patent: Dec. 29, 2015

(54) SPEED CONTROL APPARATUS AND PROGRAM FOR SPEED CONTROL APPARATUS; AND AUTOMATIC VEHICLE DRIVING APPARATUS, ENGINE DYNAMO CONTROL APPARATUS, AND CONTROL PROGRAMS USED FOR RESPECTIVE APPARATUSES

(71) Applicant: HORIBA, Ltd., Kyoto (JP)

(72) Inventor: Takao Konishi, Kyoto (JP)

(73) Assignee: Horiba, Ltd., Kyoto (JP)

( * ) Notice: Subject to any disclaimer, the term of this patent is extended or adjusted under 35 U.S.C. 154(b) by 60 days.

(21) Appl. No.: 13/726,950

(22) Filed: Dec. 26, 2012

(65) Prior Publication Data

US 2013/0190997 A1    Jul. 25, 2013

(30) Foreign Application Priority Data

Dec. 26, 2011  (JP) ................................. 2011-284574
May 1, 2012   (JP) ................................. 2012-104984

(51) Int. Cl.
*B60W 10/00* (2006.01)
*B60W 10/02* (2006.01)
*G06F 17/00* (2006.01)
(Continued)

(52) U.S. Cl.
CPC ...... *G06F 17/00* (2013.01); *F02D 9/02* (2013.01); *G05D 13/62* (2013.01); *Y10T 477/6403* (2015.01); *Y10T 477/70* (2015.01)

(58) Field of Classification Search
CPC .................. Y10T 477/70; Y10T 477/6403
See application file for complete search history.

(56) References Cited

U.S. PATENT DOCUMENTS

| 4,947,970 A | * | 8/1990 | Miller et al. | 477/30 |
| 8,460,155 B2 | * | 6/2013 | Murakami | 477/77 |
| 8,682,550 B2 | * | 3/2014 | Nelson et al. | 701/58 |

(Continued)

FOREIGN PATENT DOCUMENTS

| JP | 51-116386 A | 10/1976 |
| JP | 61-146435 U | 9/1986 |

(Continued)

OTHER PUBLICATIONS

Office Action dated Mar. 17, 2015 issued for Japanese patent application No. 2011-284574, 2 pgs.

(Continued)

*Primary Examiner* — James Trammell
*Assistant Examiner* — Demetra Smith-Stewart
(74) *Attorney, Agent, or Firm* — Brooks Kushman P.C.

(57) ABSTRACT

In order to further improve followability of an actual vehicle speed with respect to a commanded vehicle speed at a starting time point, the present invention is provided with a vehicle speed control part that, a predetermined time before the starting time point that is a time when the commanded vehicle speed rises from zero, sets a clutch position of a vehicle to an initial intermediate position where power is partially transmitted, and at and during a certain period of time after the starting time point, performs clutch feedback control that changes the clutch position depending on a deviation between the actual vehicle speed and the commanded vehicle speed so as to make the actual vehicle speed follow the commanded vehicle speed, wherein the vehicle speed control part sets the initial intermediate position depending on rising commanded acceleration that is a time rate of change at the time when a value of the commanded vehicle speed rises from zero.

2 Claims, 14 Drawing Sheets

(51) Int. Cl.
*F02D 9/02* (2006.01)
*G05D 13/62* (2006.01)

(56) References Cited

U.S. PATENT DOCUMENTS

2006/0137957 A1 6/2006 Bruckner et al.
2009/0254258 A1* 10/2009 Ishikawa et al. ............... 701/68
2010/0228450 A1* 9/2010 Takahashi et al. ............. 701/51
2013/0096796 A1* 4/2013 Lee ................................ 701/70

FOREIGN PATENT DOCUMENTS

| | | |
|---|---|---|
| JP | 03-084225 A | 4/1991 |
| JP | 03-092623 A | 4/1991 |
| JP | 03-272432 | 12/1991 |
| JP | 05-059281 U | 8/1993 |
| JP | 09133610 | 5/1997 |
| JP | 2000338008 | 12/2000 |
| JP | 2003-075299 | 3/2003 |
| JP | 2003-121309 | 4/2003 |
| JP | 2010-151160 A | 7/2010 |

OTHER PUBLICATIONS

Office Action dated Oct. 20, 2015 issued for Japanese Patent Application No. 2012-104984, 5 pgs.

* cited by examiner

SPEED CONTROL APPARATUS AND PROGRAM FOR SPEED CONTROL APPARATUS; AND AUTOMATIC VEHICLE DRIVING APPARATUS, ENGINE DYNAMO CONTROL APPARATUS, AND CONTROL PROGRAMS USED FOR RESPECTIVE APPARATUSES

CROSS-REFERENCE TO RELATED APPLICATIONS

This application claims priority to Japanese Application No. 2011-284574, filed Dec. 26, 2011, and Japanese Application No. 2012-104984, filed May 1, 2012, the disclosures of each of which are incorporated in their entirety by reference herein.

TECHNICAL FIELD

The present invention relates to a vehicle control apparatus and a program for the vehicle control apparatus that, for example, perform speed control of a vehicle on a chassis dynamometer, and in particular, at the starting time point of a vehicle, control a clutch to make an actual vehicle speed of the vehicle follow a commanded vehicle speed.

Also, the present invention relates to an automatic driving apparatus and automatic driving program that are intended to, in the case where a vehicle such as an automobile is run with drive wheels being placed on a rotating drum of a chassis dynamometer, and a dynamic running performance test of the vehicle is performed, automatically drive the vehicle.

BACKGROUND ART

This sort of speed control apparatus as described in Patent literature 1 can automatically drive a vehicle according to a predetermined running speed pattern by controlling an accelerator and brake of the vehicle. Also, an apparatus that is adapted to, in the case of a vehicle having a clutch, such as a manual transmission car, control a position of the clutch to control a speed of the vehicle during a certain period of time from a start has been conventionally known.

To describe specifically, the conventional speed control apparatus moves the clutch from a disconnect position to a predetermined slip position in advance slightly before a starting time point when a commanded vehicle speed rises from zero, and at and after the starting time point, drives the clutch by an amount corresponding to a deviation between the commanded vehicle speed and an actual vehicle speed such that the actual vehicle speed follows the commanded vehicle speed.

The reason why the clutch is moved to the slip position in advance slightly before the starting time point as described is because if feedback control of the clutch is started at the disconnect position, as illustrated in FIG. 1, the clutch starts to move eventually after the deviation between the commanded vehicle speed and the actual vehicle speed has been generated, and therefore a time lag inevitably occurs to deteriorate followability to the commanded vehicle speed at the starting time point.

However, the clutch is moved to the predetermined slip position (hereinafter also referred to as an initial intermediate position) before the starting time point, and therefore in the case where a rising angle of the commanded vehicle speed, i.e., commanded acceleration is small, as illustrated in FIG. 2, a situation where the actual vehicle speed exceeds the commanded vehicle speed may come up at the beginning of the start. This is because in the case of moving the clutch to the slip position, power is transmitted to wheels, and the vehicle attempts to move at a certain level of acceleration.

However, if the slip position is set to a position close to the disconnect position of the clutch, in the case where in turn, the commanded acceleration is large, a situation where the actual vehicle speed cannot sufficiently follow the commanded vehicle speed comes up immediately after the start.

Meanwhile, in order to perform a dynamic running performance test of a vehicle, vehicle running simulation driving has been performed by a chassis dynamometer, and in the running performance test, an automatic vehicle driving apparatus has been used in order to make it possible to perform the test constantly under the same running conditions. The automatic vehicle driving apparatus is configured to be able to automatically perform operations of pushing amounts of an accelerator pedal, clutch pedal, and brake pedal, switching of a shift lever, and other operations with use of actuators such as motors (see Patent literature 2).

More specifically, by referring to a running performance map so as to follow a predetermined running pattern provided for by the running performance test, sequentially required accelerator opening levels are obtained, and to achieve the accelerator opening levels, control of the accelerator pedal is performed by an accelerator opening level control mechanism. Note that the running performance map refers to data in which in learning driving, vehicle speeds and acceleration values are obtained at variously different accelerator opening levels, and the accelerator opening levels, vehicle speeds, and acceleration values at multiple points are related to one another.

Meanwhile, in the running performance test, in addition to making a vehicle speed of a vehicle follow a vehicle speed provided for by regulations, an engine rotation number is also required to keep an appropriate value. For example, at the starting time point of an MT car, it is required to keep an engine rotation number that prevents an engine from stalling due to a variation in connecting amount of a clutch, and also to prevent an engine rotation number higher than necessary from being outputting. This is because in the case where the engine rotation number higher than necessary is outputted, even if the vehicle can follow the running pattern, for example, a test result of analyzing exhaust gas from the vehicle is adversely influenced as compared with the case of an adequate amount of engine rotation number.

In recent years, engine characteristics have been changed, and therefore in vehicle speed control based on an automatic vehicle driving apparatus at the starting time point of an MT car, when the vehicle control is performed with the running performance map being referred to, an engine rotation number tends to have a higher value than an expected value. In order to solve such a problem, an automatic vehicle driving apparatus having an accelerator control system 104 configured for a starting time point as illustrated in FIG. 12 is used in some cases.

The accelerator control system 104 illustrated in FIG. 12 is described. In this diagram, a vehicle VH is an MT car that receives accelerator and clutch operations, and an accelerator opening level control mechanism 5A illustrated in a block immediately before a block of the vehicle VH is a mechanism that receives an accelerator opening level serving as a target value, and changes an accelerator pushing amount so as to achieve the accelerator opening level.

First, in a target vehicle speed generation part 1A, from a vehicle speed pattern $V_{pat}$ specified by a running pattern, a target vehicle speed $V_{ref}$ to be achieved by the vehicle VH is generated. An accelerator calculating part 2A in a stage subsequent to the target vehicle speed generation part 1A differentiates the target vehicle speed $V_{ref}$ to output target acceleration $\alpha_{ref}$.

A running performance map reference part 4A in a stage subsequent to the acceleration calculating part 2A is inputted with a deviation $V_{new}$ between the target vehicle speed $V_{ref}$ and an after-mentioned correcting vehicle speed $V_{amd}$, and the target acceleration $\alpha_{ref}$, and refers to the running performance map for the vehicle VH on the basis of such vehicle speeds and acceleration to output each corresponding accelerator opening level $\theta_{map}$. The accelerator opening level control mechanism 5A changes an accelerator pushing amount $A_{act}$ so as to achieve the accelerator opening level $\theta_{map}$ that is outputted with reference to the running performance map.

Note that a vehicle speed correcting part A1 illustrated in the middle of a loop returning from the vehicle VH to the running performance map reference part 4A is a component that is provided in order to prevent the engine rotation number from being made higher than the desired value as described above. The vehicle speed correcting part A1 is placed on the basis of the idea that if the target vehicle speed is decreased by an amount corresponding to a deviation $R_{err}$ between the engine rotation number $R_{act}$ measured in the vehicle VH and a target engine rotation number $R_{ref}$, the engine rotation number will also be decreased, and one that converts the excess engine rotation number $R_{err}$ into a vehicle speed in consideration of a gear ratio, clutch connecting amount, and tire diameter of the vehicle VH to output the above-described correcting vehicle speed $V_{amd}$.

The automatic vehicle driving apparatus having the accelerator control system 104 configured for the starting time as illustrated in FIG. 12 outputs the accelerator opening level $\theta_{map}$ with reference to a point P2 that is a point lowered in terms of an inputted vehicle speed value from a point P1, which was supposed to be referred to if the vehicle speed correcting part A1 was absent, by an amount equal to the vehicle speed corresponding to the excess engine rotation number $R_{err}$, as illustrated in a graph of FIG. 9. To the extent of seeing the graph of FIG. 9, it is considered that for example, in the case where the engine rotation number is made too high, the accelerator opening level having a target value to be inputted to the accelerator opening level control mechanism 5A is reduced from $\theta_2$ to $\theta_3$ because of the presence of the vehicle speed correcting part A1, and as a result, the accelerator pushing amount $A_{act}$ is moved back to decrease the engine rotation number $R_{act}$.

However, in practice, as a result of an experiment made by the present inventor, even in the case where the accelerator control system 104 for the starting time was configured as illustrated in FIG. 12, an engine rotation number excessively increased at the starting time of an MT car was unable to be sufficiently decreased and restored to a value close to a desired engine rotation number.

The reasons why even in the case where the accelerator control system 104 as illustrated in FIG. 12 was used, the engine rotation number was unable to be prevented from being excessively increased at the starting time point of the MT car may include the following reasons.

(1) The running performance map is created by collecting pieces of data on accelerator opening levels corresponding to various combinations of a vehicle speed and acceleration; however, measurement for the collection can be made only in a state where a clutch is completely rigidly connected. That is, in a state where the clutch is in the connecting, such as a half-engaged clutch state at a starting time, i.e., in a state where a torque variation easily occurs, the running performance map is fundamentally inaccurate, and even in the case where the running performance map reference part refers to the accelerator opening level at the target vehicle speed obtaining by subtracting the vehicle speed corresponding to the excess engine rotation number as illustrated in a graph of FIG. 13, the accelerator opening level enough to sufficiently decrease the engine rotation number is not necessarily returned. As described, the fact that reliability of the running performance map itself is low in a region where the clutch is not completely connected is considered to be one of the big reasons why the engine rotation number cannot be well controlled.

(2) In addition, a reason other than the accuracy of the running performance map can also be considered. Even if the running performance map in vehicle speed and acceleration regions at the starting time has a certain level of accuracy, it is not that an absolute value of a slope of the acceleration with respect to the vehicle speed under the condition of a constant accelerator opening level is large as illustrated in the graph of FIG. 13, but the absolute value may be substantially horizontal as illustrated in FIG. 14. In the case of a vehicle having such a running performance map, even in the case of referring to an accelerator opening level with subtracting a vehicle speed corresponding to an excess engine rotation number, the accelerator opening level outputted from the running performance map reference part changes little. Accordingly, the accelerator pushing amount from the accelerator opening level control mechanism also changes little, and therefore it is considered that the state where the engine rotation number is high is kept.

Further, at the starting time of the MT car, the engine rotation number is not only excessively increased, but instead, depending on characteristics of an engine, may be excessively decreased to stall the engine. In such a case as well, it is difficult for the accelerator control system as illustrated in FIG. 12 to restore to the desired engine rotation number.

CITATION LIST

Patent Literature

Patent literature 1: JPA H09-133610
Patent literature 2: JPA 2000-338008

SUMMARY OF INVENTION

Technical Problem

The present invention is made in order to solve such a problem, and intended to elaborate control of a clutch to further improve followability of an actual vehicle speed with respect to a commanded vehicle speed at a starting time.

Also, the present invention is made in consideration of the problem as described above, and intended to provide an automatic vehicle driving apparatus and a program for the automatic vehicle driving apparatus that, in the case where an engine rotation number actually outputted at the starting time of an MT car is out of a desired engine rotation number, preferably make a correction so as to restore to the desired engine rotation number.

Further, the present invention is intended to provide an engine dynamo control apparatus and a program for the engine dynamo control apparatus that, in the case where an engine rotation number actually outputted in the engine dynamo control apparatus used for an engine dynamo for an MT car, is out of a desired engine rotation number, make a correction so as to restore to the desired engine rotation number.

Solution to Problem

That is, a speed control apparatus according to the present invention is provided with: an actual vehicle speed obtaining part that obtains an actual vehicle speed of a vehicle; a commanded vehicle speed obtaining part that obtains a commanded vehicle speed of the vehicle; and a vehicle speed control part that, a predetermined time before a starting time point that is a time when the commanded vehicle speed rises from zero, sets a clutch position of the vehicle to an initial intermediate position where power is partially transmitted, and at and after the starting time point, performs clutch feedback control that changes the clutch position depending on a deviation between the actual vehicle speed and the commanded vehicle speed such that the actual vehicle speed follows the commanded vehicle speed, wherein the vehicle speed control part sets the initial intermediate position to a position closer to a connecting position of a clutch as rising commanded acceleration, which is a time rate of change at the time when a value of the commanded vehicle speed rises from zero, is increased.

If so, as the rising commanded acceleration is increased, the initial intermediate position of the clutch comes closer to the connecting position of the clutch to increase an initial power transmitting rate, whereas as the rising commanded acceleration is decreased, the initial intermediate position comes closer to a disconnect position of the clutch to decrease the initial power transmitting rate.

Accordingly, even in the case where at the starting time point, rising commanded acceleration values are different from each other, rising actual acceleration values that are approximated to the respective rising commanded acceleration values can be obtained, and therefore subsequently, at and after the starting time point, a smooth transition to the clutch feedback control can be made to drastically improve the speed follow-up performance of the actual vehicle speed with respect to the commanded vehicle speed.

Also, the automatic vehicle driving apparatus according to the present invention is an automatic vehicle driving apparatus for an MT car, which is provided with an accelerator opening level control mechanism that controls a pushing amount of an accelerator pedal so as to achieve an accelerator opening level inputted as a target value, and provided with: a correcting parameter storage part that stores a correcting parameter that is preliminarily set for each of vehicle speed and engine rotation number divisions that are set by using one or more engine rotation number threshold values to divide respective vehicle speed regions that are set by further using one or more vehicle speed threshold values to divide a predetermined vehicle speed band at a time when a clutch is in a state of being in connecting; and an accelerator opening level correcting part that, from the correcting parameter storage part, obtains a correcting parameter set for one of the vehicle speed and engine rotation number divisions that contains a current vehicle speed and a current engine rotation number, and changes an accelerator opening level inputted to the accelerator opening level control mechanism as a current target value by an amount equal to an accelerator opening level based on the correcting parameter.

If so, regarding a region where reliability of a running performance map is low because a clutch is in a state of being in the connecting as at the starting time of an MT car to cause a torque variation or the like, a correcting parameter that, for each of the vehicle speed and engine rotation number divisions, indicates, in the case where the engine rotation number is displaced from a target value, how much the rotation number should be decreased is preliminarily individually stored in the correcting parameter storage part, and the accelerator opening level correcting part is configured to obtain the correcting parameter set for the vehicle speed and engine rotation number division containing the current vehicle speed and engine rotation number, and correct the accelerator opening level on the basis of the correcting parameter, so that without being influenced by the reliability of the running performance map, the accelerator opening level can be constantly corrected by a correcting parameter having a predetermined value. Accordingly, the current engine rotation number can be automatically brought close to a desired engine rotation number.

Also, in the respective vehicle speed and engine rotation number divisions, correcting parameters are individually set, and therefore, for example, in a division where the vehicle speed is low, and if the engine rotation number is excessively decreased, an engine stall occurs, the correcting parameter can set such that the engine rotation number is changed a little, whereas in a division where the vehicle speed is high, and even if the engine rotation number is largely decreased, it is not necessary to worry about the engine stall, the correcting parameter can be set such that the engine rotation number is largely changed. That is, an appropriate correcting parameter can be set for each of the vehicle speed and engine rotation number divisions, so that the engine rotation number can be prevented from being excessively increased, and at the same time, the engine stall can be prevented from occurring.

In order to make it possible to meet the fact that the engine rotation number required at the starting time or the like is largely different depending on the vehicle speed, and also make it possible to make corrections so as to obtain appropriate engine rotation numbers over the entire area of the vehicle speed band at the starting time it is only necessary that the respective vehicle speed and engine rotation number divisions are set with at least part of the engine rotation number threshold values set for the respective vehicle speed regions being made different.

In order to, even in the case where a vehicle type, transmission configuration, gear ratio, or the like is different, make it possible to appropriately correct the engine rotation number without successively changing the correcting parameter, it is only necessary that the vehicle speed thresholds are vehicle speeds that are converted from engine rotation numbers on the assumption that the clutch is completely connected, respectively.

Specific examples of the correcting parameter for preferably reducing an excessive increase in engine rotation number at the starting time include an example where the correcting parameter is an accelerator opening level reduction amount to be reduced from a current accelerator opening level.

In order to make it possible to constantly bring the engine rotation number close to a desired value, and also make it possible to prevent the engine rotation number from being drastically decreased due to the correction of the accelerator opening level to cause an engine stall, it is only necessary that as the reduction amount, a larger value is set in a vehicle speed and engine rotation number division having a larger engine rotation number.

In order to, without reference to a running performance map, make it possible to surely correct the engine rotation number by directly changing a target value inputted to the accelerator opening level control mechanism, it is only necessary that a running performance map reference part that refers a vehicle running performance map that is obtained in advance by learning driving on the basis of inputted acceleration and an inputted vehicle speed, and outputs a map-referenced accelerator opening level that is a corresponding to the inputted acceleration and inputted vehicle speed is further provided; the accelerator opening level correcting part is configured to, on the basis of the obtained correcting parameter, output a correcting accelerator opening level that is an accelerator opening level corresponding to an engine rotation number whose amount is to be changed from the current engine rotation number; and the accelerator opening level control mechanism is configured to be, as a target value, inputted with an accelerator opening level obtained by subtracting the correcting accelerator opening level from the map-referenced accelerator opening level.

In order to, with reference to the running performance map instead, make it possible to add characteristics of each vehicle to bring the engine rotation number close to a desired value, and make it possible to effectively reduce the accelerator opening level even in a slope of acceleration with respect to a vehicle speed in the running performance map is small, it is only necessary that a running performance map reference part that refers a vehicle running performance map that is obtained in advance by learning driving on a basis of inputted acceleration and an inputted vehicle speed, and outputs a map-referenced accelerator opening level that is a corresponding to the inputted acceleration and inputted vehicle speed is further provided: the accelerator opening level correcting part is comprising a corresponding acceleration output part that, on the basis of the obtained correcting parameter, outputs correcting acceleration that is acceleration corresponding to an engine rotation number whose amount is to be changed from the current engine rotation number, and an acceleration and accelerator opening level converting part that, on the basis of the correcting acceleration, refers to the running performance map to perform a conversion to a corresponding accelerator opening level; and the accelerator opening level control mechanism is configured to be, as a target value, inputted with an accelerator opening level obtained by subtracting the correcting accelerator opening level from the map-referenced accelerator opening level.

Programs for later adding an engine rotation number correcting function having been described above to an existing automatic vehicle driving apparatus include an automatic vehicle driving program that is used for an automatic vehicle driving apparatus for an MT car, which is provided with an accelerator opening level control mechanism that controls a pushing amount of an accelerator pedal so as to achieve an accelerator opening level inputted as a target value, and provided with: a correcting parameter storage part that stores a correcting parameter that is preliminarily set for each of vehicle speed and engine rotation number divisions that are set by using one or more engine rotation number threshold values to divide respective vehicle speed regions that are set by further using one or more vehicle speed threshold values to divide a predetermined vehicle speed band at a time when a clutch is in a state of being in connecting; and an accelerator opening level correcting part that, from the correcting parameter storage part, obtains a correcting parameter set for one of the vehicle speed and engine rotation number divisions that contains a current vehicle speed and a current engine rotation number, and changes an accelerator opening level inputted to the accelerator opening level control mechanism as a current target value by an amount equal to an accelerator opening level based on the correcting parameter. Also, a recording medium that records the automatic vehicle driving program may be used to make a system update of each existing automatic vehicle driving apparatus.

Not only in the case where an actual vehicle is driven to perform a test, but also in the case where a test or evaluation on a single body of power train including an engine and a transmission is performed, in order to solve a problem that at the engine starting time, the engine rotation number is made excessively larger or smaller than a desired value, which is the same problem as that described above, it is only necessary that an engine dynamo control apparatus used for an engine dynamo for an MT car, which is provided with a throttle opening level control mechanism that controls an engine so as to achieve a throttle opening level inputted as a target value, is provided with: a correcting parameter storage part that stores a correcting parameter that is preliminarily set for each of dynamo rotation number and engine rotation number divisions that are set by using one or more engine rotation number threshold values to divide respective dynamo rotation number regions that are set by further using one or more dynamo rotation number threshold values to divide a predetermined dynamo rotation number band at a time when a clutch is in a state of being in connecting; and a throttle opening level correcting part that, from the correcting parameter storage part, obtains a correcting parameter set for one of the dynamo rotation number and engine rotation number divisions that contains a current dynamo rotation number and a current engine rotation number, and changes a throttle opening level inputted to the throttle opening level control mechanism as a current target value by an amount equal to a throttle opening level based on the correcting parameter.

Further, in order to make it possible to improve an existing engine dynamo control apparatus, it is only necessary to use a program for an engine dynamo control apparatus that is used for an engine dynamo for an MT car, which is provided with a throttle opening level control mechanism that controls an engine so as to achieve a throttle opening level inputted as a target value, and provided with: a correcting parameter storage part that stores a correcting parameter that is preliminarily set for each of dynamo rotation number and engine rotation number divisions that are set by using one or more engine rotation number threshold values to divide respective dynamo rotation number regions that are set by further using one or more dynamo rotation number threshold values to divide a predetermined dynamo rotation number band at a time when a clutch is in a state of being in connecting; and a throttle opening level correcting part that, from the correcting parameter storage part, obtains a correcting parameter set for one of the dynamo rotation number and engine rotation number divisions that contains a current dynamo rotation number and a current engine rotation number, and changes a throttle opening level inputted to the throttle opening level control mechanism as a current target value by an amount equal to a throttle opening level based on the correcting parameter.

Advantageous Effects of Invention

According to the present invention as described above, as the rising commanded acceleration is increased, the initial intermediate position of the clutch comes closer to the connecting position of the clutch to increase the initial power transmitting rate, whereas as the rising commanded acceleration is decreased, the initial intermediate position comes closer to the disconnect position of the clutch to decrease the initial power transmitting rate. Accordingly, even in the case where at the starting time point, rising commanded acceleration values are different from each other, rising actual acceleration values that are approximated to the respective rising commanded acceleration values can be obtained, and therefore subsequently, at and after the starting time point, a smooth transition to the clutch feedback control can be made to drastically improve the speed followability of the actual vehicle speed with respect to the commanded vehicle speed.

Further, according to the present invention, for the respective vehicle speed and engine rotation number divisions, the correcting parameters are set, and each of the correcting parameters can be appropriately used to thereby surely reduce the engine rotation number, for example, even if the engine rotation number is unnecessarily excessively increased at the starting time of an MT car. Also, in such an occasion, the engine rotation number can also be preferably prevented from being excessively decreased to cause an engine stall or the like. Further, according to the engine dynamo control apparatus of the present invention, the engine dynamo control device can also solve a corresponding problem in the same manner.

REFERENCE SIGNS LIST

41X: Actual vehicle speed obtaining part
42X: Commanded vehicle speed data accumulating part
43X: Commanded vehicle speed obtaining part
44X: Commanded acceleration obtaining part
45X: Clutch position obtaining part
46X: Speed control part
100: Automatic driving apparatus
52: Accelerator opening level control mechanism, throttle opening level control mechanism
7: Correcting parameter storage part
8: Accelerator opening level correcting part, throttle opening level correcting part

DESCRIPTION OF EMBODIMENTS

In the following, a first embodiment of the present invention is described with referenced to the drawings.

Figure 1:
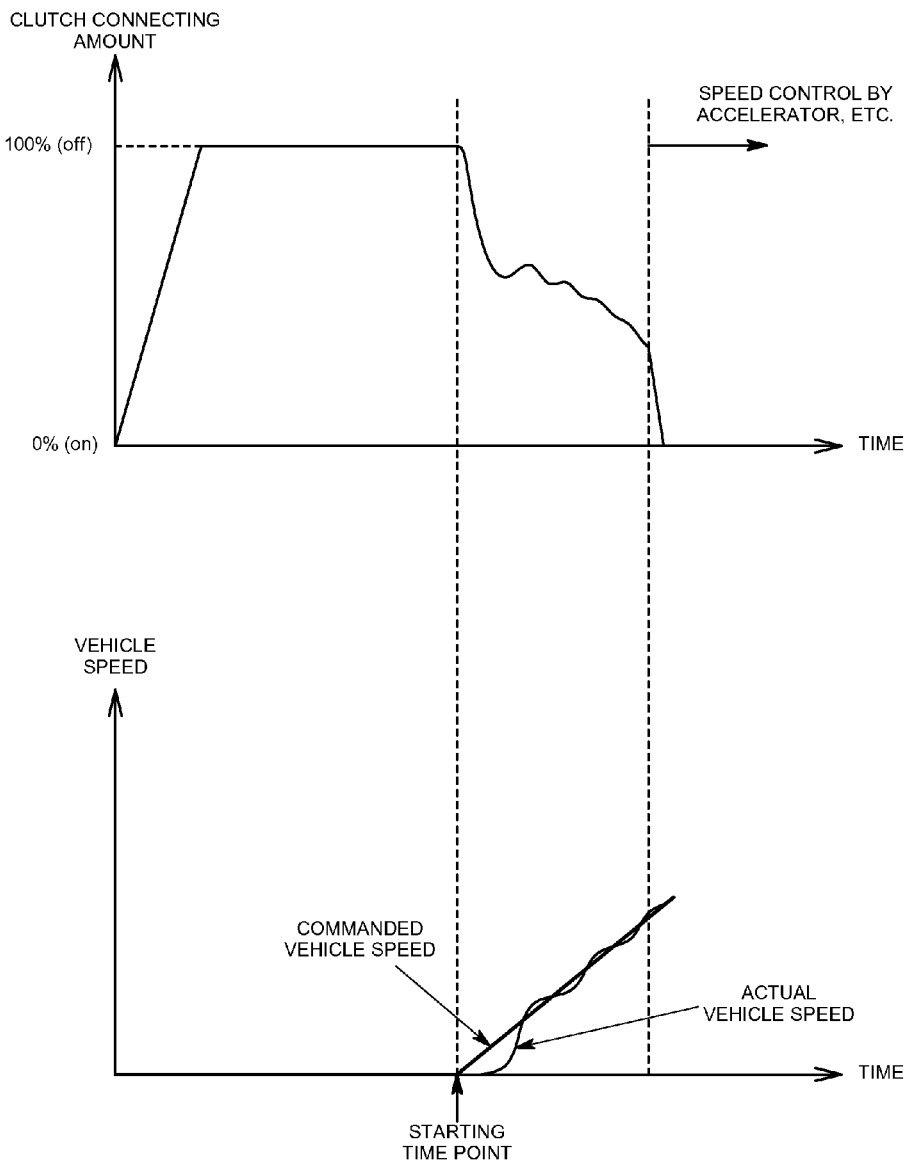
FIG. 1 is a time-dependent vehicle speed change diagram illustrating a time dependent change in actual vehicle speed with respect to a commanded vehicle speed in the case of starting feedback control of a clutch at a disconnect position.
Figure 2:
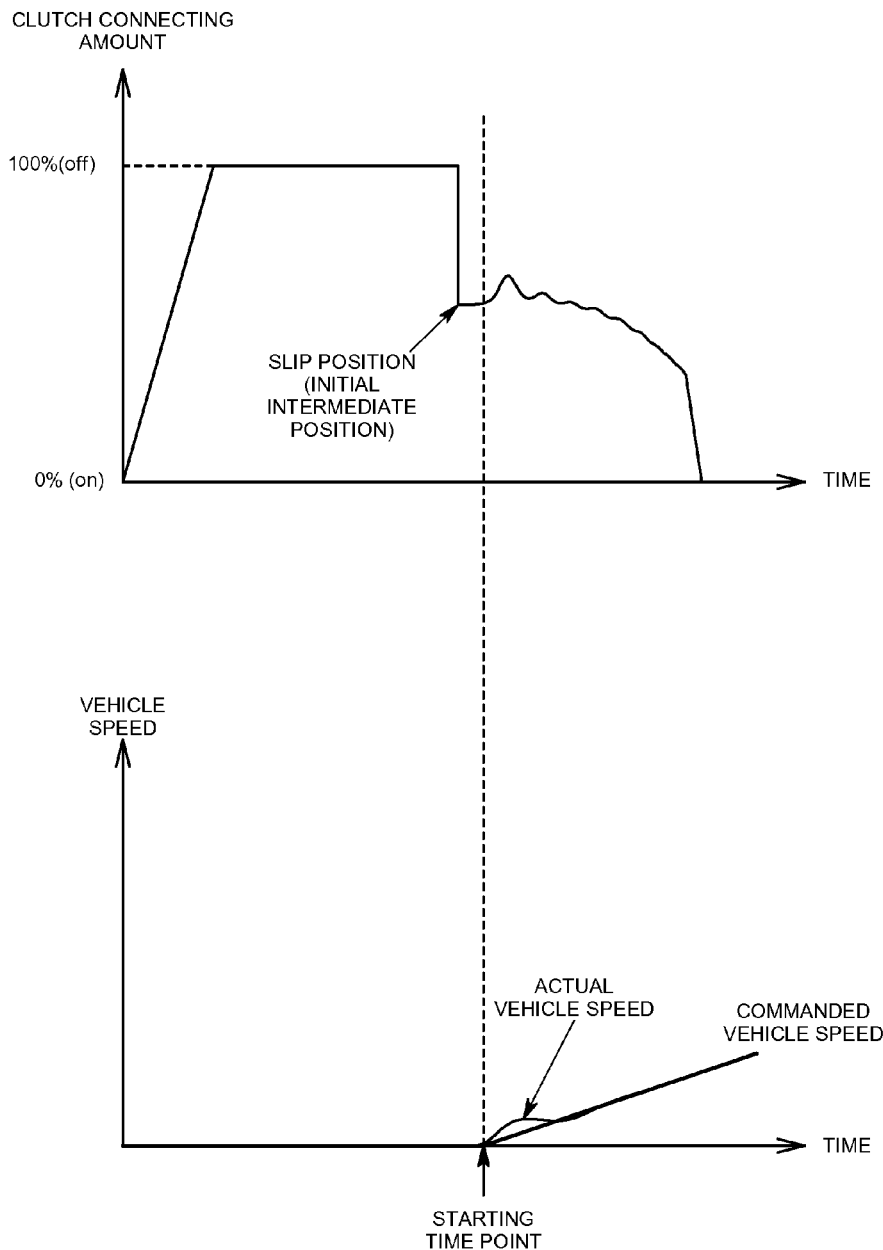
FIG. 2 is a time-dependent vehicle speed change diagram illustrating a time-dependent change in accrual vehicle speed with respect to a commanded vehicle speed in the case of performing conventional control.
Figure 3:
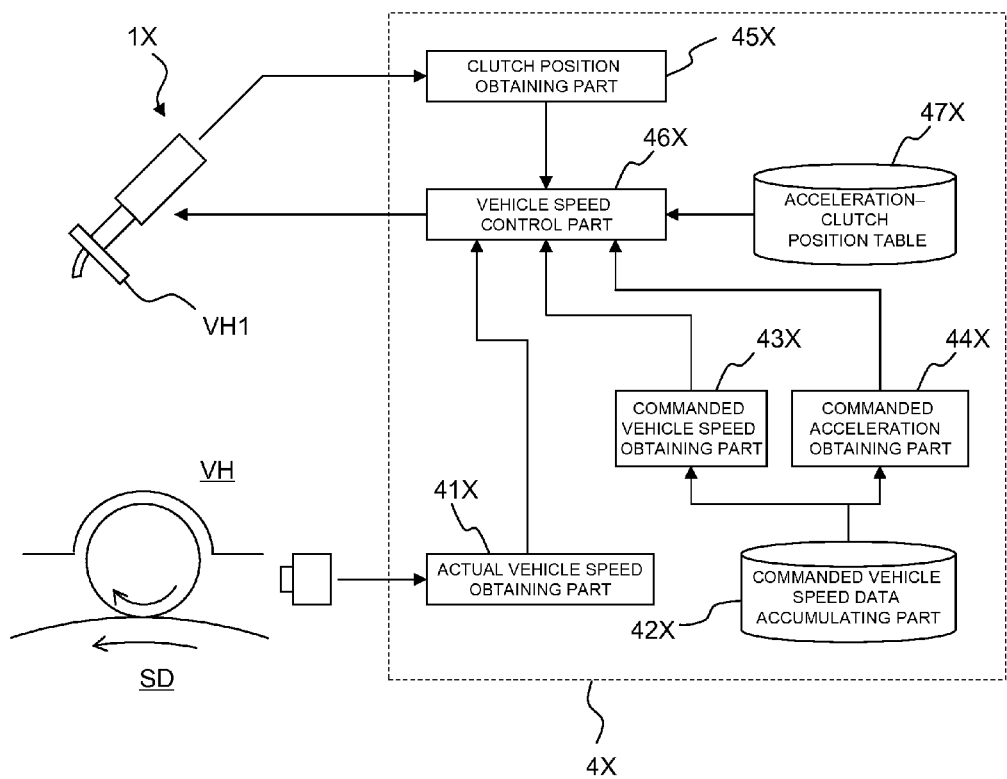
FIG. 3 is a functional block diagram illustrating a speed control apparatus in a first embodiment of the present invention.

A speed control apparatus according to the first embodiment is, as illustrated in FIG. 3, one that performs speed control of an automobile VH as a vehicle placed on a chassis dynamometer SD, and is provided with: a clutch driving mechanism 1X that is arranged in a driver's seat of the automobile VH and drives a clutch; unillustrated accelerator and brake driving mechanisms that respectively drives an accelerator and a brake; and a control main body 4X that outputs control signals to the respective driving mechanisms to control a clutch position, an accelerator opening level, and a brake pushing level.

The respective parts are described.

The clutch driving mechanism 1X is provided with a cylinder member so as to be able to move a fore end part thereof backward and forward. Also, the clutch driving mechanism 1X is configured such that the fore end part is brought into abutting contact with a clutch pedal VH1 and moved backward and forward to thereby drive the clutch.

Further, the clutch driving mechanism 1X is provided with an unillustrated position detecting part (such as a rotary encoder) that detects a backward or forward movement position of the fore end part, and thereby configured to recognize the clutch position on the basis of a position signal outputted from the position detecting part. In addition, the accelerator driving mechanism and the brake driving mechanism have the same mechanism as the clutch driving mechanism 1X, and therefore description thereof is omitted.

The control main body 4X is comprising, for example, an unillustrated CPU, memory, A/D converter, D/A converter, communication interface, and the like, and carries functions as an actual vehicle speed obtaining part 41X, commanded vehicle speed accumulating part 42X, commanded vehicle speed obtaining part 43X, commanded acceleration obtaining part 44X, clutch position obtaining part 45X, vehicle speed control part 46X, and the like on the basis of cooperative operation of the CPU and its peripheral devices according to a predetermined program stored in the memory.

The actual vehicle speed obtaining part 41X is one that receives a vehicle speed signal from a vehicle speed sensor 3 mounted in, for example, the chassis dynamometer SD or the automobile VH, and converts a value of the vehicle speed signal into an actual vehicle speed.

The commanded vehicle speed accumulating part 42X is one that is preliminarily set in a predetermined area of the memory, and accumulates commanded vehicle speed data indicating time-dependent data on a commanded vehicle speed, i.e., a commanded vehicle speed at each time.

The commanded vehicle speed obtaining part 43X is one that accesses the commanded vehicle speed data accumulating part 42X to obtain a commanded vehicle speed.

The commanded acceleration obtaining part 44X is one that accesses the commanded vehicle data accumulating part 42X to calculates commanded acceleration from a time change in commanded vehicle speed.

Figure 4:
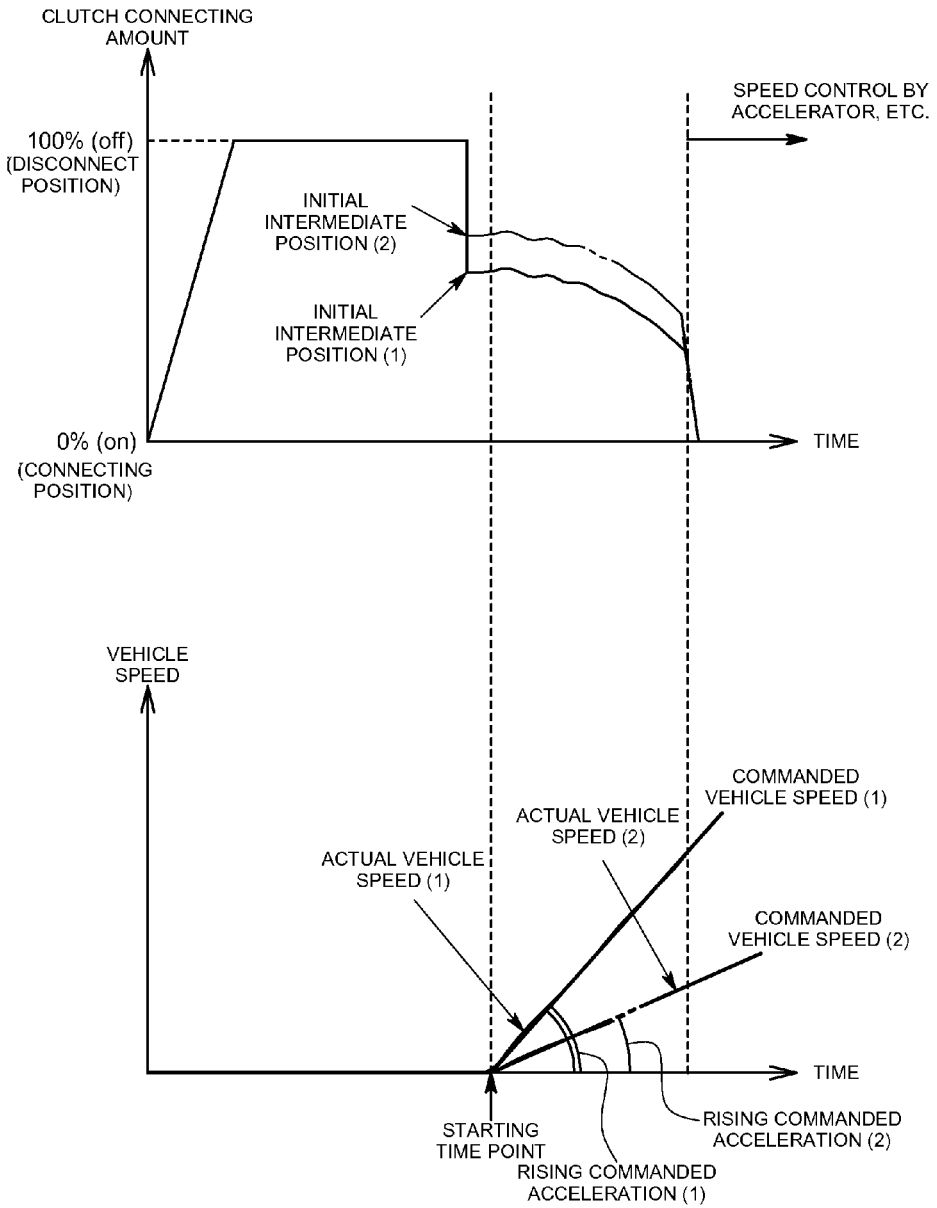
FIG. 4 is a time-dependent vehicle speed change diagram illustrating a time-dependent change in actual vehicle speed with respect to a commanded vehicle speed in the case of performing control in the first embodiment.

The clutch position obtaining part 45X is one that receives a position signal outputted from the clutch driving mechanism 1X, and converts a value of the position signal to a numerical value indicating a clutch position. As illustrated in FIG. 4, it is here assumed that a position (hereinafter referred to as a disconnect position) where the clutch does not transmit power and is completely separated is set as 100%, and a position (hereinafter referred to as a connecting position) where the clutch is connected and substantially completely transmits the power is set as 0%.

The vehicle speed control part 46X is one that, a predetermined time before a starting time point that is a time when the commanded vehicle speed rises from zero to another value, sets the clutch position of the vehicle V to an intermediate position where the power is partially transmitted, and also at and after the starting time point, to make the actual vehicle speed follow the commanded vehicle speed, performs clutch feedback control that changes the clutch position depending on a deviation between the actual vehicle speed and the commanded vehicle speed.

Next, operation of the above-described speed control apparatus is described, which doubles as detailed description of the vehicle speed control part 46X.

It is assumed that at first, the commanded vehicle speed is zero, and the clutch is at the disconnect position, i.e., the clutch is in a state of not transmitting the power.

First, the commanded vehicle speed obtaining part 43X refers to the commanded vehicle speed data accumulating part 42X to identify the starting time point, and also the commanded acceleration obtaining part 44X calculates rising commanded acceleration corresponding to a rising angle of the commanded vehicle speed at the starting time point.

Then, the vehicle speed control part 46X issues a command to the clutch driving mechanism 1X the predetermined time (e.g., 0.2 seconds) before the starting time point, and moves the clutch position from the disconnect position to a predetermined initial intermediate position. The intermediate position refers to a position that is set within a region where the clutch partially transmits the power of an engine to a wheel side.

Also, the vehicle speed control part 46X refers to an acceleration-clutch position table 47X, which is provided in a predetermined area of the memory, to identify the initial intermediate position corresponding to the rising commanded acceleration.

The acceleration-clutch position table 47X is a table that relates the rising commanded acceleration and the initial intermediate position of the clutch, and as the rising commanded acceleration is increased, a value of the initial intermediate position decreases. That is, the initial intermediate position is set closer to the connecting position of the clutch.

At and after the starting time point, the vehicle control part 46X performs the feedback control of the clutch position through the clutch driving mechanism 1X on the basis of the deviation between the commanded vehicle speed and the actual vehicle speed such that the actual vehicle speed obtained by the actual vehicle speed obtaining part 41X follows the commanded vehicle speed.

Subsequently, after a certain period of time has passed since the starting time point, or the actual vehicle speed or the commanded vehicle speed has exceeded a predetermined value, the vehicle speed control part 46X forcibly moves the clutch to the connecting position, and also switches to speed feedback control based on an accelerator or brake to make the actual vehicle speed follow the commanded vehicle speed.

In FIG. 4, a specific example is cited.

For example, in the case (1) in the same diagram, where the rising commanded acceleration is large, the initial intermediate position of the clutch is closer to the connecting position of the clutch, which increases an initial power transmitting rate, whereas in the case (2) in the same diagram, where the rising commanded acceleration is smaller than that in the case (1), the initial intermediate position is closer to the disconnect position of the clutch, which decreases initial power transmission. Accordingly, as illustrated in a speed graph of FIG. 4, even in the case where rising commanded acceleration values are different from each other at a starting time point, rising actual acceleration values that are approximated to the respective rising commanded acceleration values can be obtained, and therefore speed followability of the actual vehicle speed with respect to the commanded vehicle speed in the subsequent clutch feedback control can be drastically improved.

Note that the present invention is not limited to the above-described first embodiment. The present invention may be adapted such that the initial intermediate position is changed in a stepwise manner such as a two-step or three-step manner depending on the rising commanded acceleration, or the initial intermediate position is changed in a non-step manner, not on the basis of the acceleration-clutch position table, but by calculating the initial intermediate position on the basis of a predetermined calculation expression using the rising commanded acceleration as a parameter, or by another means.

Besides, the present invention can be, without limitation to the above-described first embodiment, variously modified without departing from the scope thereof.

Next, a second embodiment of the present invention is described with reference to the drawings.

Figure 5:
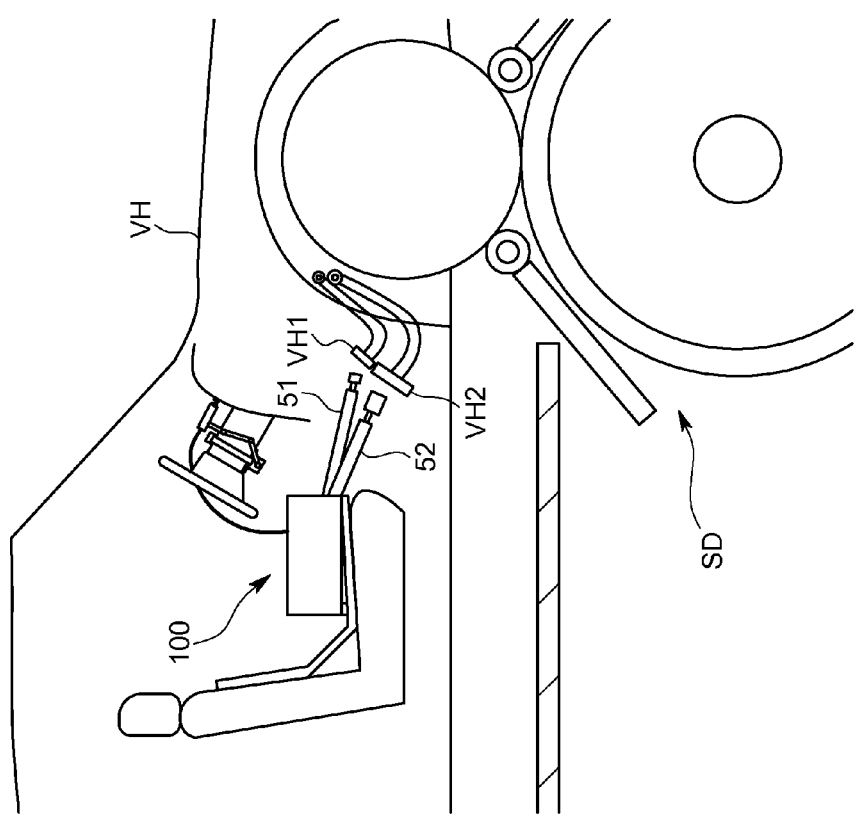
FIG. 5 is a schematic diagram illustrating an appearance of an automatic vehicle driving apparatus according to a second embodiment of the present invention.

An automatic vehicle driving apparatus 100 of the second embodiment is one that is used in order to achieve a running pattern provided for by regulations in a running performance test for an MT car. The running performance test is performed in such a manner that, for example, as illustrated in FIG. 5, in a state where front wheels serving as drive wheels of a vehicle VH are placed on a chassis dynamometer SD, the automatic vehicle driving apparatus 100 controls an accelerator pedal VH2, a clutch pedal VH1, a brake pedal, a shift lever, and the like.

The automatic vehicle driving apparatus 100 is comprising: extendable rods that are placed on a driver's seat and respectively extend toward the clutch pedal VH1 and the accelerator pedal VH2 from the drive's seat; and a control mechanism (not illustrated) that adjusts extension amounts of the respective extendable rods with an electric motor or the like to thereby operate pushing amounts of the clutch pedal VH1 and accelerator pedal VH2. The control mechanism is a so-called computer provided with a CPU, a memory, an A/D converter, a D/A converter, an input/output interface, and the like, and one that achieves operation as an after-mentioned clutch control system 101 and accelerator control system 102 for a starting time in such a manner that the CPU executes a program stored in the memory.

In other words, the automatic vehicle driving apparatus 100 is at least provided with: a clutch control mechanism 51 that controls the pushing amount of the clutch pedal VH1; and an accelerator opening level control mechanism 52 that controls the pushing amount of the accelerator pedal VH2 to control an accelerator opening level to a desired value. In addition, a control mechanism for the remaining shift lever, or the like is not illustrated in FIG. 5.

Figure 6:
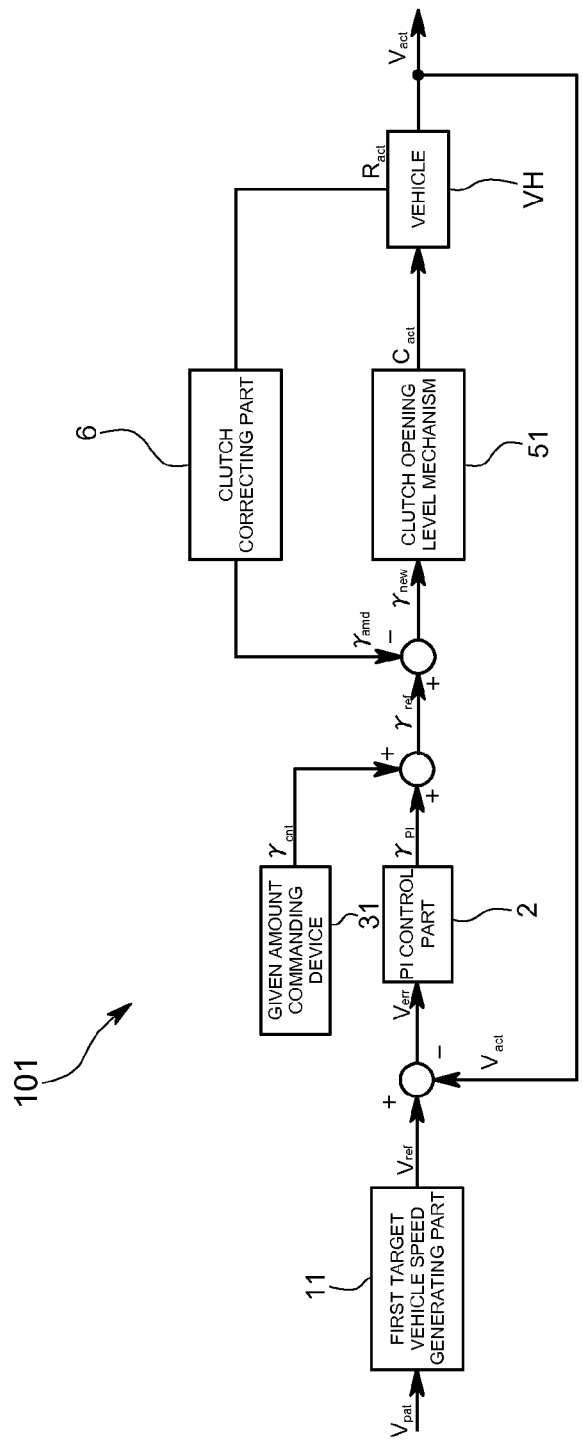
FIG. 6 is a schematic block diagram illustrating a configuration of a clutch control system for the starting time point of the automatic vehicle driving apparatus in the second embodiment.
Figure 7:
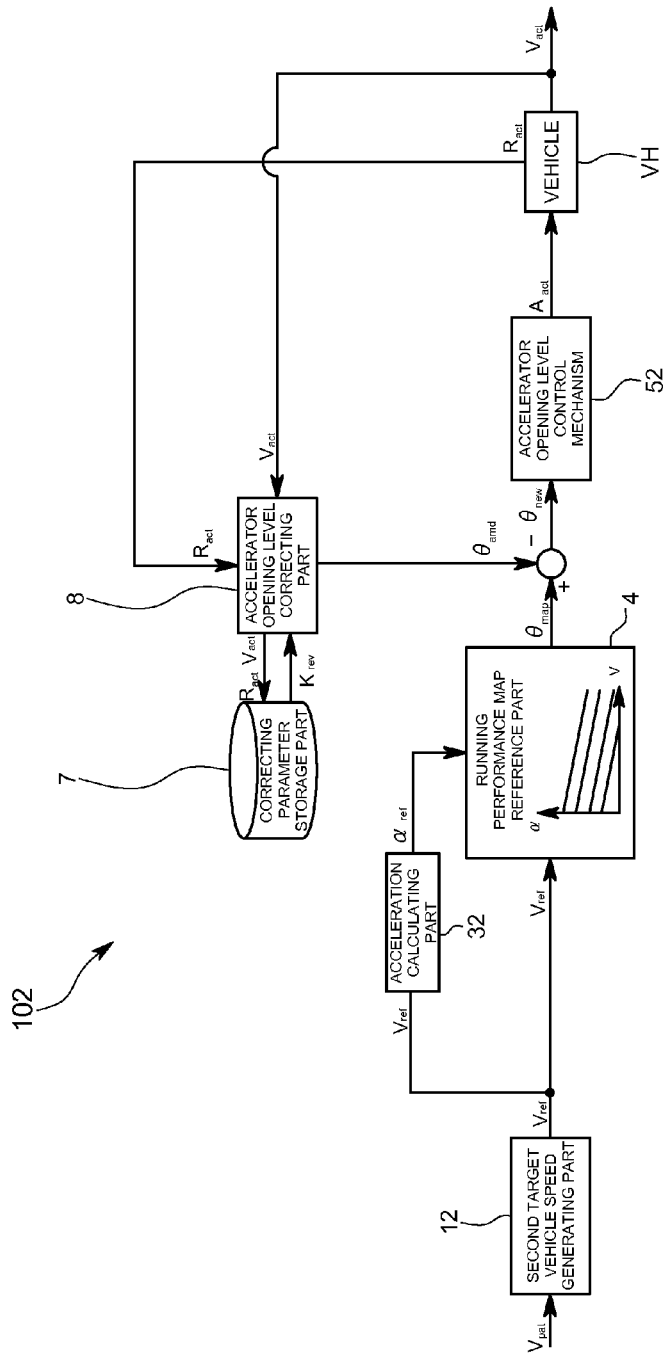
FIG. 7 is a schematic block diagram illustrating a configuration of an accelerator control system for the starting time point of the automatic vehicle driving apparatus in the second embodiment.

At the starting time, the clutch control mechanism 51 is, as illustrated in FIG. 6, one that mainly controls a connecting amount of a clutch so as to make a vehicle speed follow a target vehicle speed, and the accelerator opening level control mechanism 52 is, as illustrated in FIG. 7, one that mainly performs control so as to make an engine rotation number have a desired value.

In the following description, operation of the clutch control mechanism 51 and accelerator opening level control mechanism 52, and control systems related to the operation as illustrated in FIGS. 6 and 7 are described.

First, as illustrated in FIG. 6, the clutch control system 101 is one that is comprising a first target vehicle speed generating part 11, PI control part 2, given amount commanding device 31, clutch control mechanism 51, and clutch correcting part 6, and configured to perform feedback control of the clutch connecting amount on the basis of the vehicle speed obtained from the vehicle VH or the chassis dynamometer SD.

More specifically, the first target vehicle speed generating part 11 is one that, from a vehicle speed pattern $V_{pat}$ specified by the running pattern, generates a target vehicle speed $V_{ref}$ to be achieved by the vehicle VH.

The PI control part 2 in a stage subsequent to the first target vehicle speed generating part 11 is one that is inputted with a deviation $V_{err}$ between the target vehicle speed $V_{ref}$ and the actual vehicle speed $V_{act}$ obtained from the vehicle VH, and outputs a PI correcting clutch connecting amount $\gamma_{PI}$ on the basis of a PI operation.

The given amount commanding device 31 provided in parallel with the PI control part 2 is one that outputs a given clutch connecting amount $\gamma_{cnt}$ having a predetermined value, and the given clutch connecting amount $\gamma_{cnt}$ added with the PI correcting clutch connecting amount $\gamma_{PI}$ serves as a target clutch connecting amount $\gamma_{ref}$.

The clutch correcting part 6 obtains an engine rotation number $R_{act}$ from the vehicle, and outputs a correcting clutch amount $\gamma_{amd}$ based on a value of the engine rotation number $R_{act}$. A value obtained by subtracting the correcting clutch connecting amount $\gamma_{amd}$ from the target clutch connecting amount $\gamma_{ref}$ is inputted to the clutch control mechanism 51 as a commanded clutch connecting amount $\gamma_{new}$. The clutch control mechanism 51 changes the clutch pushing amount $C_{act}$ so as to achieve the commanded clutch connecting amount $\gamma_{new}$.

Next, the accelerator control system 102 is a control system that is, as illustrated in FIG. 7, comprising a second target vehicle speed generating part 12, acceleration calculating part 32, running performance map reference part 4, accelerator opening level control mechanism 52, correcting parameter storage part 7, and accelerator opening level correcting part 8, and fed back with the engine rotation number obtained from the vehicle VH to control an accelerator opening level. That is, the vehicle speed is not fed back.

The second target vehicle speed generating part 12 is one that, from the vehicle speed pattern $V_{pat}$ specified by the running pattern, generates the target speed $V_{ref}$ to be achieved by the vehicle VH.

The acceleration calculating part 32 in a stage subsequent to the second target vehicle speed generating part 12 is one that performs a differential operation of the target vehicle speed $V_{ref}$ to output target acceleration $\alpha_{ref}$.

The running performance map reference part 4 in a stage subsequent to the second target vehicle speed generating part 12 and the acceleration calculating part 32 is inputted with the target vehicle speed $V_{ref}$ and the target acceleration $\alpha_{ref}$, and refers to a running performance map for the vehicle VH on the basis of the vehicle speed and the acceleration to output a corresponding accelerator opening level $\theta_{map}$.

The accelerator opening level control mechanism 52 is configured to be, as an accelerator opening level having a target value, inputted with a commanded value accelerator opening level $\theta_{new}$, that is a deviation obtained by subtracting an after-mentioned correcting accelerator opening level $\theta_{amd}$, which is an output from the accelerator opening level correcting part 8, from the accelerator opening level $\theta_{map}$ outputted with reference to the running performance map. That is, the accelerator opening level control mechanism 52 changes the pushing amount $A_{act}$ of the accelerator pedal VH2 so as to achieve the commanded value accelerator opening level $\theta_{new}$.

The correcting parameter storage part 7 is one that stores a correcting parameter K that is set for each of the vehicle speed and engine rotation number divisions that are set by using one or more engine rotation number threshold values to divide respective vehicle speed regions that are set by further using one or more vehicle speed threshold values to divide a predetermined vehicle speed band at the time when the clutch is in a state of being in the connecting.

Each of the vehicle speed threshold values is set on the basis of a virtual engine rotation number that is lower than an engine rotation number in an idling state and cannot be realized in practice because of the occurrence of an engine stall. That is, each of the vehicle speed threshold values is set by, on the basis of a gear ratio and tire diameter of the vehicle VH serving as a test target, converting a vehicle speed to be achieved for the engine rotation number in a state where the clutch is completely connected. As will be described later, the vehicle speed threshold values may be set with, for example, a 100 rpm-equivalent vehicle speed, a 300 rpm-equivalent vehicle speed, and a 500 rpm-equivalent vehicle speed being respectively variously changed to, some times, 1 km/h, 3 km/h, and 5 km/h, 1.5 km/h, 4.5 km/h, and 7.5 km/h, or other speeds depending on the vehicle VH.

Figure 8:
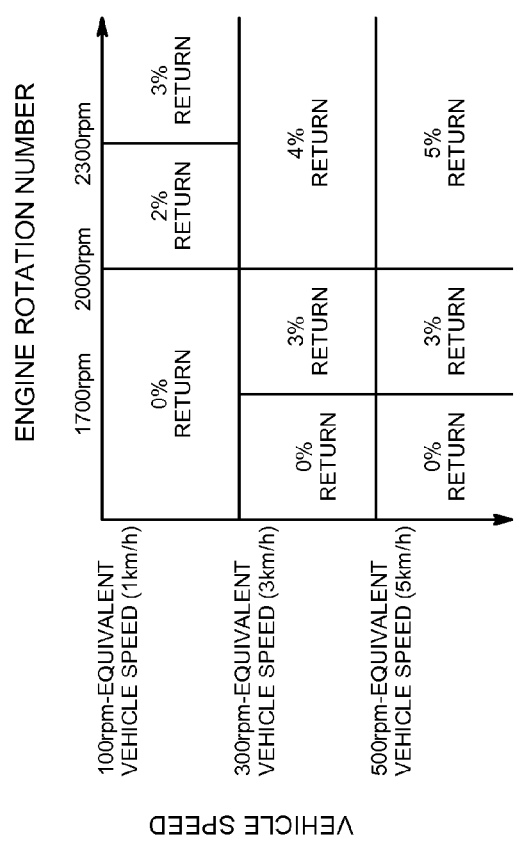
FIG. 8 is a schematic diagram illustrating an example of a correcting parameter in each of vehicle speed and engine rotation number divisions, which is stored in a correcting parameter storage part in the second embodiment.

More specifically, the vehicle threshold values are, as illustrated in FIG. 8, set to the 100 rpm-equivalent vehicle speed, 300 rpm-equivalent vehicle speed, and 500 rpm-equivalent vehicle speed, and in the vehicle speed band, a region the 100 rpm-equivalent vehicle speed or more and less than the 300 rpm-equivalent vehicle speed is set to a first vehicle speed region; a region the 300 rpm-equivalent vehicle speed or more and less than the 500 rpm-equivalent vehicle speed is set to a second vehicle speed region; and a region the 500 rpm-equivalent vehicle speed or more is set to a third vehicle speed region. Further, for each of the first to third vehicle speed regions, the engine rotation number threshold values are individually set, and in the first, second, and third vehicle speed regions, the engine rotation number threshold values are set to 2000 rpm and 2300 rpm, 1700 rpm and 2000 rpm, and 1700 rpm and 2000 rpm, respectively, to thereby set nine vehicle speed and engine rotation number divisions in total. Note that the numbers of the vehicle speed threshold values and engine rotation number threshold values may be ones or more, respectively, and are not limited to those in the example illustrated in FIG. 4. By doing this, even if the type or gear configuration of the vehicle VH is different, the same correcting parameters K that will be described later can be used to correct the accelerator opening level.

As illustrated in FIG. 8, for each of the vehicle speed and engine rotation number divisions, the correcting parameter K is individually set. In the present embodiment, the correcting parameter K is an accelerator opening level reduction amount that is to be reduced when the vehicle speed and engine rotation number of the vehicle VH falls within each of the vehicle speed and engine rotation number divisions.

The accelerator opening level correcting part 8 is, as illustrated in FIG. 7, one that, from the correcting parameter storage part 7, obtains a correcting parameter that is set for one of the vehicle speed and engine rotation number divisions containing a current vehicle speed $V_{act}$ and engine rotation number $R_{act}$, and changes an accelerator opening level, which is inputted to the accelerator opening level control mechanism 52 as a current target value, by an amount equal to an accelerator opening level based on the correcting parameter K.

More specifically, the accelerator opening level correcting part 8 is configured to make the accelerator opening level control mechanism 52 correct the current accelerator opening level obtained from the accelerator opening level control mechanism 52 by an amount equal to the correcting accelerator opening level that is calculated by multiplying the current accelerator opening level by a ratio obtained from the correcting parameter storage part 7.

As described, the accelerator opening level control mechanism 52 is configured to be, as a target value, inputted with an accelerator opening level obtained by subtracting the correcting accelerator opening level from the map-referenced accelerator opening level. That is, the present embodiment is configured not to produce a correcting value for an accelerator opening level with use of a region where a torque variation is large and reliability of the running performance map is low as at the starting time, but select an appropriate correcting accelerator opening level from among the predetermined accelerator opening level correcting values on the basis of a measured engine rotation number. Further, the present embodiment is configured to directly correct the map-referenced accelerator opening level, which is an output from the running performance map reference part 4, without the running performance map reference part 4, and can therefore surely reduce the accelerator opening level in the case where the engine rotation number is excessively increased. Also as each of the correcting values, the appropriate correcting parameter K is set for each of the vehicle speed and engine rotation number divisions, and therefore the present embodiment can preferably prevent an engine stall from occurring due to an excessive decrease in engine rotation number.

Next, a third embodiment is described. In addition, members corresponding to those in the above-described second embodiment are added with the same symbols, respectively.

Figure 9:
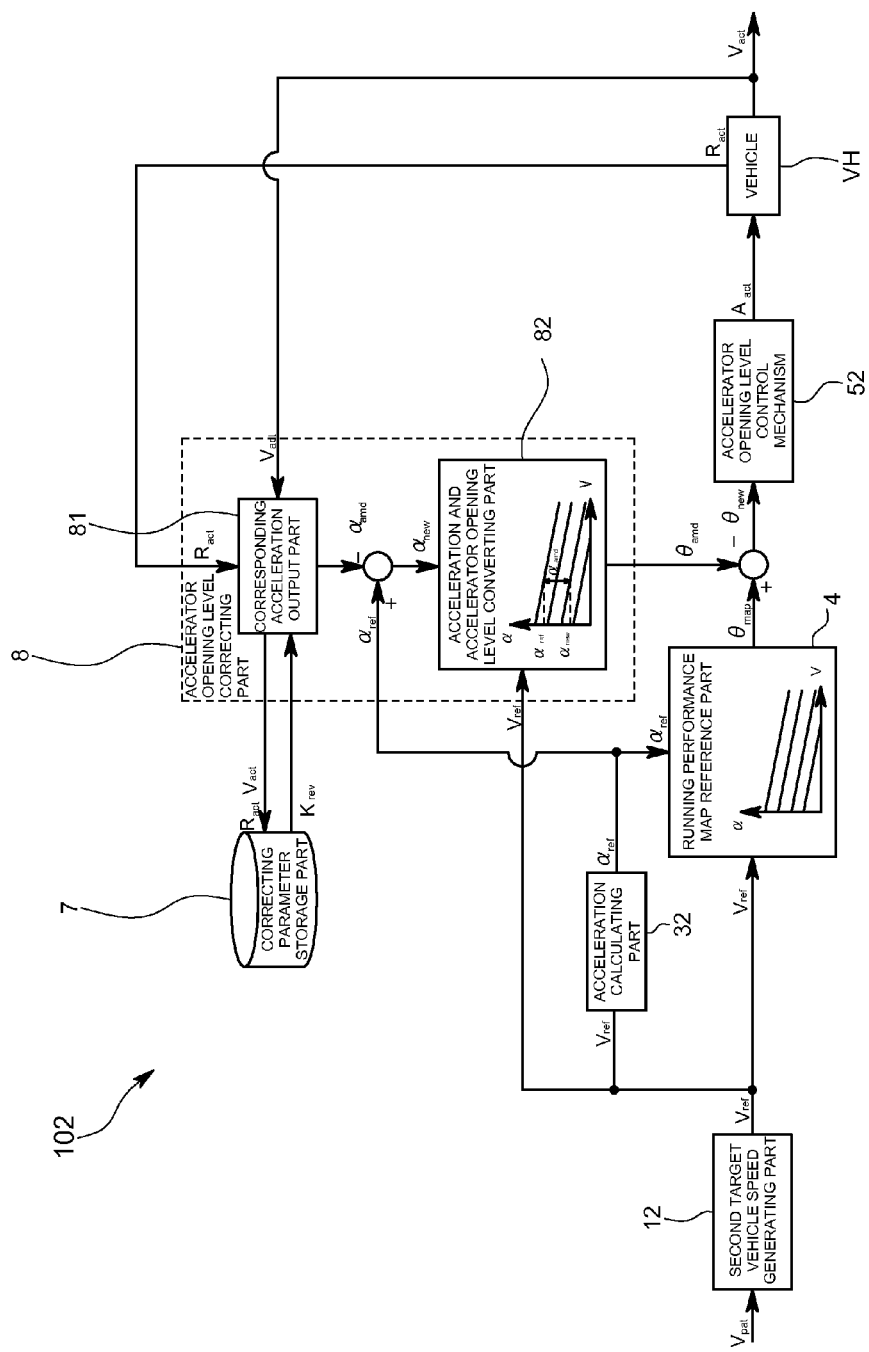
FIG. 9 is a schematic block diagram illustrating a configuration of an accelerator control system for the starting time point of an automatic vehicle driving apparatus according to a third embodiment of the present invention.

An automatic vehicle driving apparatus 100 in the third embodiment is different in an accelerator control system 102 from that in the first embodiment. As illustrated in FIG. 9, the accelerator control system 102 is configured to, on the basis of an engine rotation number $R_{act}$ obtained from a vehicle VH, calculate correcting acceleration that is acceleration corresponding to an engine rotation number corresponding to an amount to be reduced, and on the basis of the correcting acceleration and a running performance map, correct a map-referenced accelerator opening level $\theta_{map}$ to be inputted to an accelerator opening level control mechanism 5.

In the following, a correcting parameter storage part 7 and an accelerator opening level correcting part 8 that are respectively different in configurations as those in the first embodiment, and the accelerator opening level control mechanism 5 that is consequently different in operation as that in the first embodiment are described in detail.

The correcting parameter storage part 7 is the same as that in the first embodiment in terms of storing a correcting parameter K for each vehicle speed and engine rotation number division; however, the correcting parameter K is changed from target acceleration to one that indicating an amount to be changed. More specifically, an acceleration reduction amount to be reduced from current acceleration is stored.

The accelerator opening level correcting part 8 is comprising: a corresponding acceleration output part 81 that outputs correcting acceleration that is acceleration corresponding to an engine rotation number corresponding to an amount to be changed by the accelerator opening level correcting part from a current engine rotation number on the basis of an obtained correcting parameter; and an acceleration and accelerator opening level converting part 82 that, on the basis of the correcting acceleration, refers to the running performance map to perform a conversion to a corresponding correcting accelerator opening level $\theta_{amd}$.

The acceleration and accelerator opening level converting part 82 is, more specifically, adapted to, on the basis of a target vehicle speed Vref and a deviation obtained by subtracting correcting acceleration $\alpha_{amd}$ from target acceleration $\alpha_{ref}$, refer to the running performance map to output the corresponding accelerator opening level $\theta_{amd}$.

Figure 10:
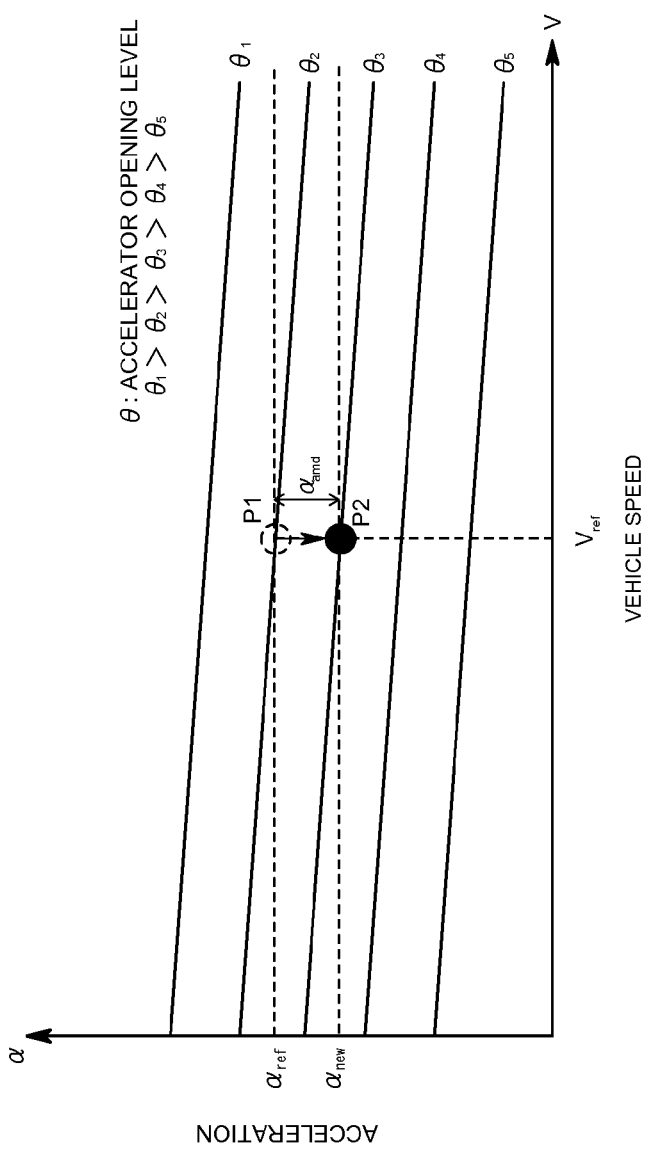
FIG. 10 is a schematic diagram illustrating operation of a running performance map reference part in the third embodiment.

As described, if acceleration is changed, and with reference to the running performance map, an accelerator opening level is corrected, a point P2 below a point P1 that was supposed to be referred to will be referred to, as illustrated in a graph of FIG. 10. That is, the accelerator opening level control mechanism 5 was supposed to set an accelerator opening level of $\theta_2$ as a target value, but will set an accelerator opening level of $\theta_3$, which is a smaller opening level, as the target value. Accordingly, the accelerator opening level control mechanism 52 decreases an accelerator pushing amount $A_{act}$ to make the accelerator opening level smaller than a current one, and can correspondingly decrease an engine rotation number.

Figure 14:
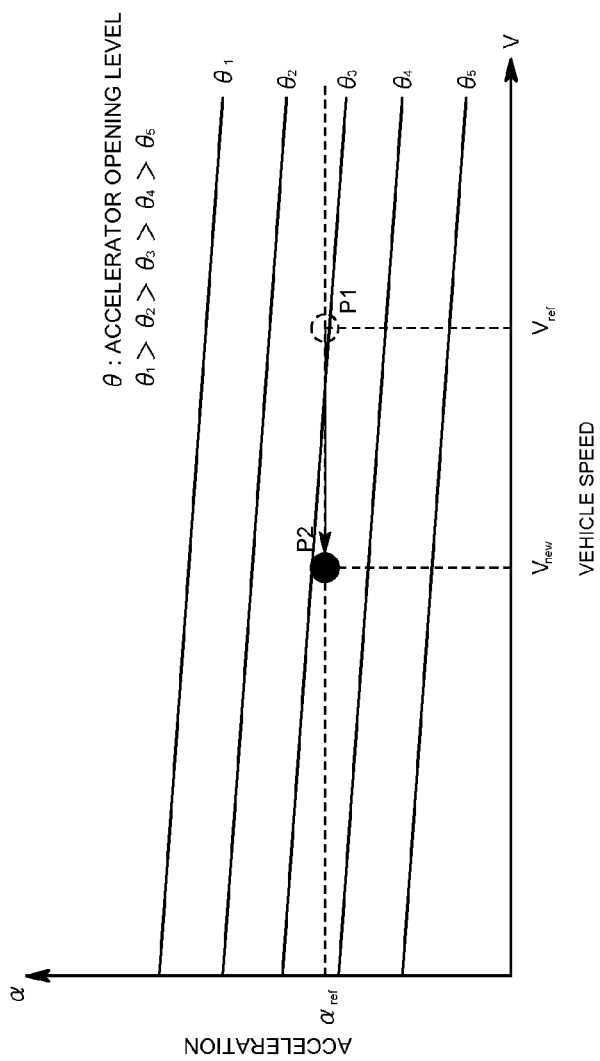
FIG. 14 is a schematic diagram illustrating operation in the case where an experiment was actually made on the conventional example.

When comparing the third embodiment with the conventional case, there is a difference in that, in the running performance map, in the conventional case, a reference point is displaced along the horizontal axis serving as a vehicle speed axis, whereas in the third embodiment, a reference point is displaced along the vertical axis serving as an acceleration axis. In the conventional method, as illustrated in FIG. 10 or 14, in the case where an absolute value of a slope of each straight line is smaller than a predetermined value, and each straight line is substantially horizontal, the accelerator opening level is not changed even by displacing the reference point, and as a result the engine rotation number cannot also be decreased. On the other hand, in the third embodiment, the reference point is displaced along the vertical axis of the graph, and therefore even in a state where an absolute value of a slope of each straight line is smaller than a predetermined value, and each straight line is substantially horizontal, a point where the accelerator opening level is largely different can be surely arrived at. Accordingly, even in the case of referring to the running performance map, the engine rotation number can be prevented from being excessively increased.

Next, a fourth embodiment of the present invention is described with reference to FIG. 11.

In the above-described second or third embodiment, the automatic vehicle driving apparatus 100 for performing the running test on the chassis dynamometer SD is described; however, as described in the fourth embodiment, the present invention may use the apparatus as an engine dynamo control device for evaluating a single body of engine. More specifically, by configuring a throttle control system 193 that is substantially the same as the accelerator control system 102, the problem that the engine rotation number at the engine starting time is made excessively larger or smaller than a desired value can be solved.

Figure 11:
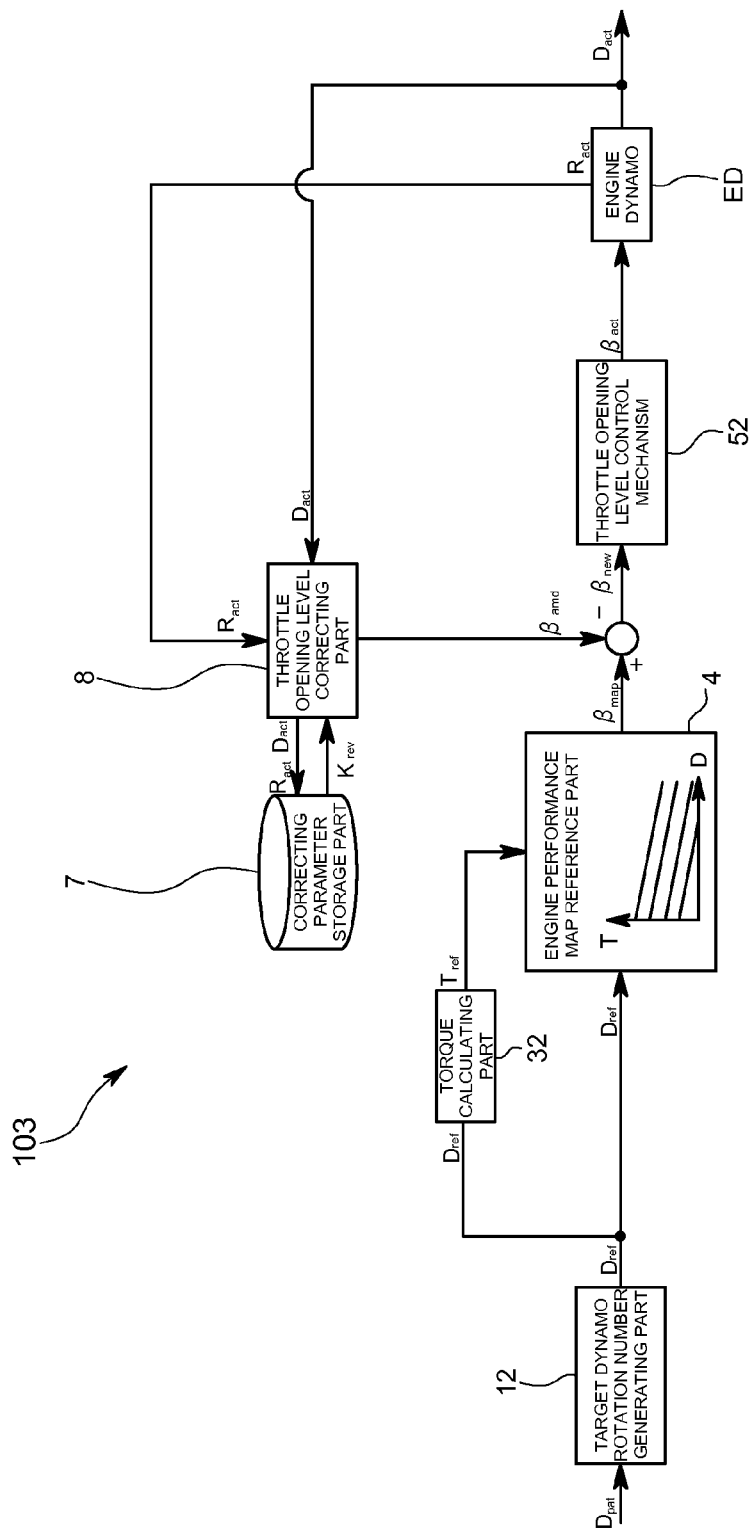
FIG. 11 is a schematic block diagram illustrating a configuration of a throttle control system for the starting time point of an engine dynamo control apparatus according to a fourth embodiment of the present invention.
Figure 12:
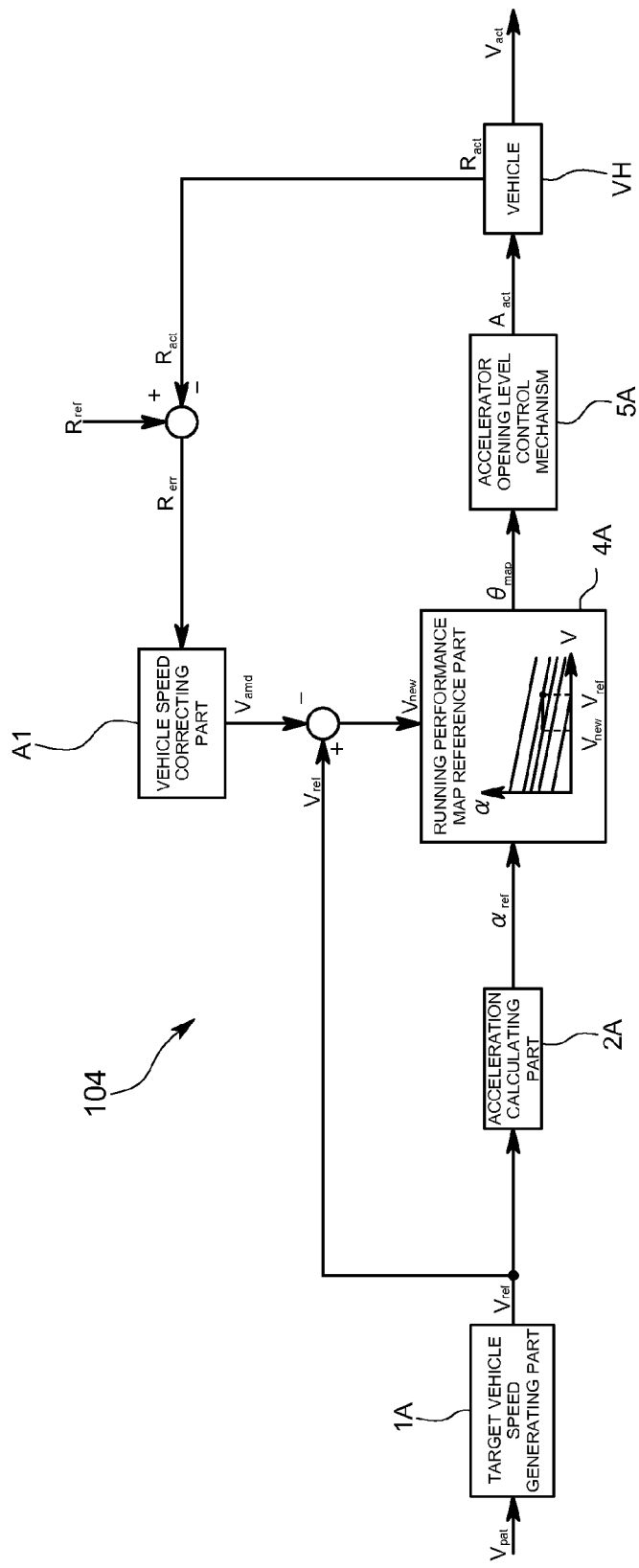
FIG. 12 is a schematic block diagram illustrating a control system of a conventional automatic vehicle driving apparatus provided with a configuration for correcting an engine rotation number.
Figure 13:
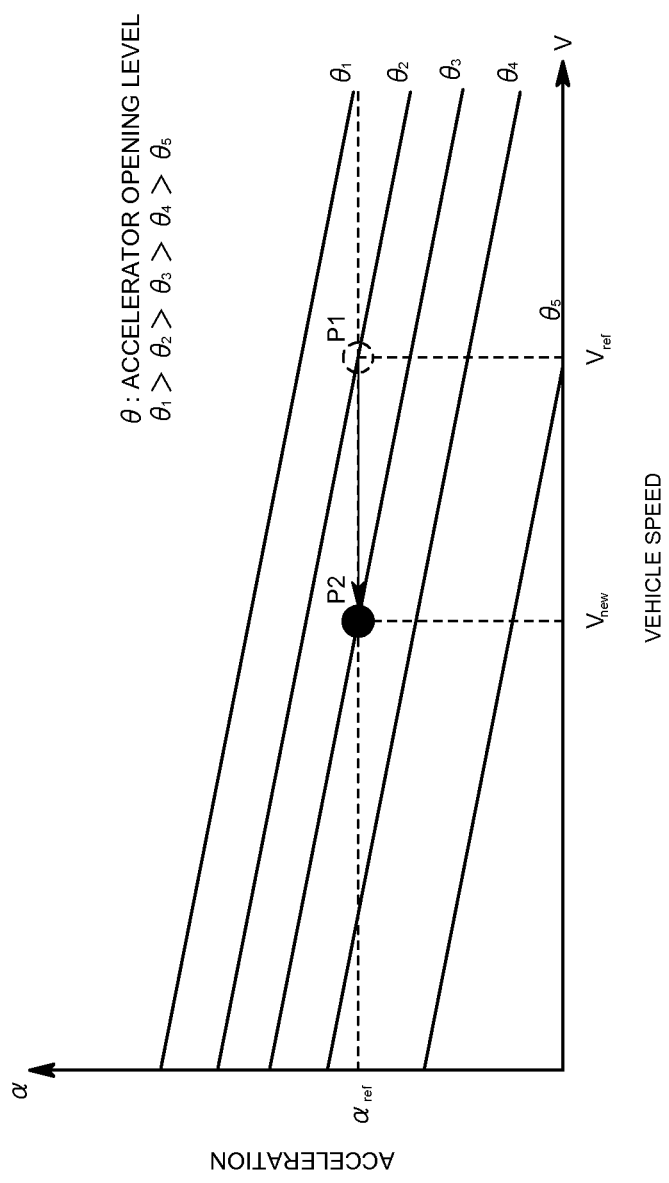
FIG. 13 is a schematic diagram illustrating operation in a running performance map reference part in a conventional example.

The throttle control system 103 is, as is clear from a comparison between FIGS. 7 and 11, one that is changed with the vehicle speed, the acceleration, and the accelerator opening level being respectively made to correspond to a dynamo rotation number, a torque, and a throttle opening level, and although different in parameter from the accelerator control system 102 in terms of control, substantially the same as the accelerator control system 102.

More specifically, the throttle control system 103 is one that is provided with: a target dynamo rotation number generating part 12 that generates a target dynamo rotation number $D_{ref}$ from a dynamo drive pattern $D_{pat}$; a torque calculating part 32 that calculates a target torque $T_{ref}$ from the target dynamo rotation number $D_{ref}$; an engine performance map reference part 4 that refers to an engine performance map that maps a relationship among a dynamo rotation number, a torque, and a throttle opening level, and outputs a map-referenced throttle opening level $\beta_{map}$ from the target dynamo rotation number $D_{ref}$ and the target torque $T_{ref}$; a correcting parameter storage part 7 for correcting the map-referenced throttle opening level $\beta_{map}$; and a throttle opening level correcting part 8.

The correcting parameter storage part 7 is one that stores a correcting parameter K that is preliminarily set for each of dynamo rotation number and engine rotation number divisions that are set by using one or more engine rotation number threshold values to divide respective dynamo rotation number regions that are set by further using one or more dynamo rotation number threshold values to divide a predetermined dynamo rotation number band containing a state where a clutch is in the connecting. Note that the correcting parameter K is a throttle opening level amount to be reduced in each of the dynamo rotation number and engine rotation number divisions.

The throttle opening level correcting part 8 is one that obtains, from the correcting parameter storage part 7, a correcting parameter K that is set for one of the dynamo rotation number and engine rotation number divisions containing a current dynamo rotation number and engine rotation number, and changes a throttle opening level inputted to a throttle opening level control mechanism 52 as a current target value by an amount equal to a throttle opening level based on the correcting parameter J. In the third embodiment, the correcting parameter K is a throttle opening level reduction amount itself, and therefore directly used in order to restore an opening level from the map-reference throttle opening level $\beta_{map}$.

If so, even at the time of evaluating a single body of engine, in the case where an engine rotation number is excessively increased, the target throttle opening level inputted to the throttle opening level control mechanism 52 can be appropriately reduced to constantly bring the engine rotation number close to a desired value.

Other embodiments are described.

The correcting parameter storage part stores an accelerator opening level amount or acceleration amount itself to be reduced, and the accelerator opening level correcting part directly use a value obtained from the correcting parameter storage part; however, used may be a change ratio from a current accelerator opening level or acceleration. In this case, it is only necessary to make the accelerator opening level control part have a function to calculate a correcting amount by multiplying a ratio stored as a correcting parameter by a current opening level or the like.

Also, each of the above-described embodiments focuses on preventing the engine rotation number from being excessively increased at the starting time point; however, the present invention may be used to, in the case where the engine rotation number is excessively decreased instead, increase the accelerator pushing amount.

Further, the present invention may add an engine rotation number correcting function by installing a program provided with functions as, for example, the accelerator opening level correcting part and the correcting parameter storage part of the present invention in an existing automatic vehicle driving apparatus or engine dynamometer.

Besides, various modifications, and combinations of the embodiments may be made without departing from the scope of the present invention.

The invention claimed is:

1. A speed control apparatus comprising:
   a controller including
      actual vehicle speed obtaining logic that obtains an actual vehicle speed of a vehicle,
      commanded vehicle speed obtaining logic that obtains a commanded vehicle speed of the vehicle, and
      vehicle speed control logic that, a predetermined time before a starting time point that is a time when the commanded vehicle speed rises from zero, sets a clutch position of the vehicle to an initial intermediate position where power is partially transmitted, and after the starting time point, performs clutch feedback control that changes the clutch position depending on a deviation between the actual vehicle speed and the commanded vehicle speed to make the actual vehicle speed follow the commanded vehicle speed, wherein
      the vehicle speed control logic sets the initial intermediate position depending on rising commanded acceleration that is a time rate of change at the time when a value of the commanded vehicle speed rises from zero.

2. A program embodied in non-transitory computer readable media for a speed control apparatus, the program, when executed by the speed control apparatus, causes the speed control apparatus to fulfill functions as:
   actual vehicle speed obtaining logic that obtains an actual vehicle speed of a vehicle;
   commanded vehicle speed obtaining logic that obtains a commanded vehicle speed of the vehicle; and
   vehicle speed control logic that, a predetermined time before a starting time point that is a time when the commanded vehicle speed rises from zero, sets a clutch position of the vehicle to an initial intermediate position where power is partially transmitted, and at and after the starting point, performs clutch feedback control that changes the clutch position depending on a deviation between the actual vehicle speed and the commanded vehicle speed to make the actual vehicle speed follow the commanded vehicle speed, wherein
   the vehicle speed control logic sets the initial intermediate position depending on rising commanded acceleration that is a time rate of change at the time when a value of the commanded vehicle speed rises from zero.

* * * * *